July 23, 1963  L. ZELIGOWSKY  3,098,554

WORKPIECE TURNOVER DEVICE

Filed May 31, 1961

INVENTOR.

BY Leo Zeligowsky

Wm. R. Glisson

ATTORNEY

United States Patent Office 3,098,554
Patented July 23, 1963

3,098,554
WORKPIECE TURNOVER DEVICE
Leo Zeligowsky, Narberth, Pa., assignor to The Budd Company, Philadelphia, Pa., a corporation of Pennsylvania
Filed May 31, 1961, Ser. No. 113,930
5 Claims. (Cl. 198—33)

This invention relates to a workpiece turnover device and has for an object the provision of improvements in this art.

One of the particular objects of the invention is to provide a turnover device which is simple in construction, dependable in operation, and durable in service. Gravity coupled with a simple belt conveyor and a simple pusher are the only means needed.

Another object is to provide a turnover device which can readily be transported and used in different parts of a plant.

Another object is to provide a turnover device which can handle a great variety of sizes and shapes of workpieces. No adjustment is needed for parts of different size or shape.

Another object is to provide a turnover device which will not damage the workpieces.

The above and other objects and advantages of the invention will be apparent from the following description of an exemplary embodiment, reference being made to the accompanying drawings wherein.

Figure 1:
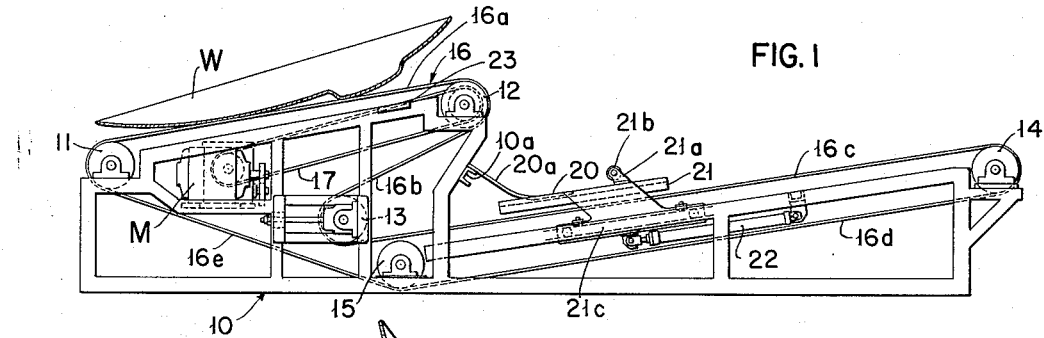
FIG. 1 is a side elevation of a device embodying the invention.
Figure 2:
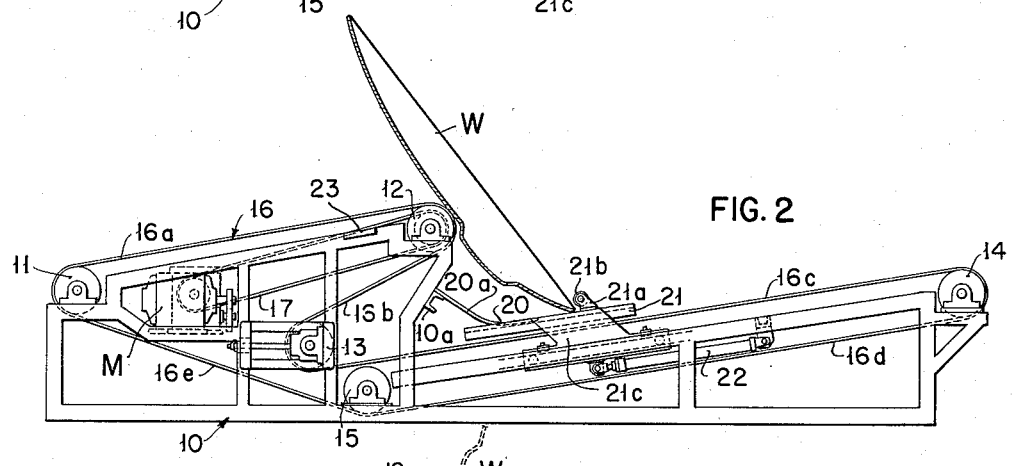
FIG. 2 is a view like FIG. 1 but showing the workpiece in a different position.
Figure 3:
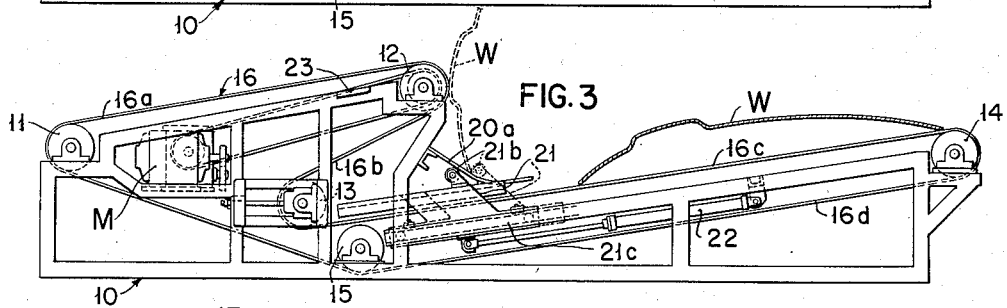
FIG. 3 is a view like FIGS. 1 and 2 but showing the workpiece further advanced in position.
Figure 4:
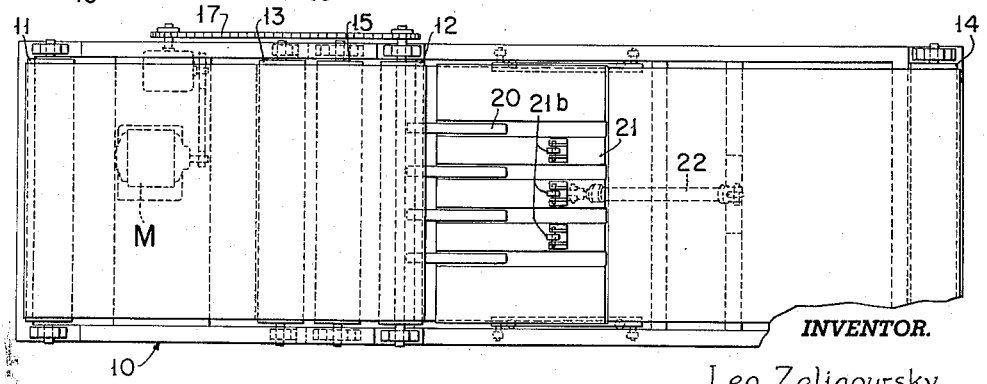
FIG. 4 is a top plan view.

The device or apparatus comprises a frame 10 having bearings supporting a plurality of drums or rolls 11, 12, 13, 14 and 15 over which passes a wide endless belt 16 in a first or upper conveyor span 16a (over drums 11 and 12), a drop span 16b (over drums 12 and 13, the latter being adjustable for tightening the belt), a second or lower conveyor span 16c (over drums 13 and 14), a first return span 16d (over drums 14 and 15), and a second return span 16e (over drums 15 and 11). The drum 12 is power-driven, as by a motor M and a belt 17.

The frame 10 is provided with hooks or rings at suitable locations so it may be picked up by a crane and transported to various places for use in the plant.

A slatted support 20 is provided below the overhanging upper end of the first belt span 16a and above the lower span 16c, the support being inclined upwardly at its rear end at 20a and secured to a frame cross beam 10a.

A pusher frame 21 is supported at its ends beyond the sides of the span 16c of the belt and between the slats of support 20 is provided with upstanding pusher fingers 21a carrying rollers 21b which are adapted to engage the end of a workpiece W after it drops down from the first belt span and push it rearwardly along the slatted support, the rollers 21b escaping from below the lower end of the workpiece as it rides up the inclined portion 20a of the support.

The lower transverse slide portion 21c of the pusher frame is operated by one or more power devices 22 anchored at one end (as the piston rod) to the pusher frame and anchored at the other end (as the cylinder end) to the main frame 10.

The power device is timed to be operated as required, as by hand or automatically, preferably the latter; and for this purpose a timing device 23 is actuated by the passage thereover of a workpiece. The device 23 may be responsive to weight, magnetic effects, capacitance effects or the like of the workpiece, the one indicated being a capacitance device since this is readily available in standard reliable forms on the market.

In operation, a workpiece W is placed on the first conveyor span 16a (as by hand or by dropping down from a press or its server) and moves along toward the overhanging exit end of this span. As the workpiece nears the end of the span it trips the timing device 23 to start the pusher 21 into operation (with appropriate time delay, if necessary). When the forward end of the workpiece falls down on the slatted support 20 behind the pusher fingers the pusher is operated to move the end of the workpiece rearwardly and cause the workpiece to fall over in inverted position on the second conveyor belt span 16c.

At the exit end of the second conveyor span the workpiece is removed by hand or otherwise for further disposition. The pusher moves forward again ready for action on the next workpiece.

It will thus be seen that the invention provides a device which is simple, inexpensive and reliable.

While one embodiment has been described for purposes of illustration, it is to be understood that there may be various embodiments and modifications within the general scope of the invention.

What is claimed is:

1. A workpiece turnover device comprising in combination,
    a first conveyor having an overhang for transporting a workpiece in a first direction,
    a second conveyor having one end below said overhang of said first span for transporting a workpiece in said first direction,
    a slidable pusher mounted over a portion of said second conveyor for movement parallel thereto opposite to said first direction,
    and a catcher on said pusher for catching the leading edge of a downward tilted workpiece fed in said first direction from said first conveyor for pivoting said downward tilted workpiece against said first conveyor by the movement of said catcher and said pusher to turn said workpiece over upon said second conveyor.

2. A workpiece turnover device, comprising in combination, a first belt conveyor span having an overhanging exit end, a second belt conveyor span having its entry end located below the overhanging exit end of the first belt conveyor span, and a pusher slidably movable parallel to said second belt conveyor span located above the entry end of the second belt conveyor span and having a linear movement to push the forward end of a workpiece rearwardly beneath said first belt conveyor span to turn it over upon the second belt conveyor span.

3. A device as set forth in claim 2, which further includes a slatted support for the end of the workpiece above the entry end of the second belt conveyor span, the pusher having pusher elements operating in the spaces between the slats of said support.

4. A device as set forth in claim 3, which further includes a rearwardly upwardly inclined portion on said slatted support, and said pusher elements moving below the top surface of the slatted support and releasing the end of the workpiece at the end of the rearward movement.

5. A device as set forth in claim 3 in which said pusher elements have rollers which move under the workpiece at the end of the rearward movement.

References Cited in the file of this patent
UNITED STATES PATENTS
1,860,491    Burtchaell _____ May 31, 1932